United States Patent
Möbius

[19]

[11] Patent Number: 5,952,555
[45] Date of Patent: Sep. 14, 1999

[54] METHOD AND APPARATUS FOR MEASURING AND CONTROLLING THE AIR-FUEL MIXTURE, E.G. IN MOTOR VEHICLES

[75] Inventor: Hans-Heinrich Möbius, Greifswald, Germany

[73] Assignee: Heraeus Holding GmbH, Hanau, Germany

[21] Appl. No.: 08/836,801

[22] PCT Filed: Dec. 5, 1994

[86] PCT No.: PCT/EP94/04040

§ 371 Date: May 19, 1997

§ 102(e) Date: May 19, 1997

[87] PCT Pub. No.: WO95/16109

PCT Pub. Date: Jun. 15, 1995

[30] Foreign Application Priority Data

Dec. 7, 1993 [DE] Germany .............................. 43 41 632

[51] Int. Cl.$^6$ ............................ F01N 3/10; G01N 27/417; G01M 15/00
[52] U.S. Cl. .............................................. 73/23.32; 60/276
[58] Field of Search ................... 60/276, 277; 73/23.31, 73/23.32, 116, 117.2, 117.3, 118.1; 701/101

[56] References Cited

U.S. PATENT DOCUMENTS

| | | | |
|---|---|---|---|
| 5,175,997 | 1/1993 | Blanke | 73/118.1 |
| 5,203,165 | 4/1993 | Wild et al. | 60/276 |
| 5,365,216 | 11/1994 | Kotwicki et al. | 73/23.31 |
| 5,493,896 | 2/1996 | Riegel | 73/23.31 |

FOREIGN PATENT DOCUMENTS

| | | |
|---|---|---|
| 24 45 444 A1 | 4/1975 | Germany. |
| 40 24 210 A1 | 2/1992 | Germany. |
| 43 23 879 A1 | 1/1995 | Germany. |
| 43 41 632 A1 | 6/1995 | Germany. |

OTHER PUBLICATIONS

Derwent English abstract of DE 40 24 210, Schnaibel et al./Bosch.
Derwent English abstract of DE 43 23 879, Mobius.

*Primary Examiner*—George Dombroske
*Attorney, Agent, or Firm*—Milton Oliver; Ware, Fressola, Van Der Sluys & Adolphson LLP

[57] ABSTRACT

A new method, to determine and control the air-fuel ratio for motor vehicles by employing a known method to determine the air factor lambda from the partial oxygen pressure of an exhaust gas brought to near total chemical equilibrium condition when knowing the mean chemical composition of the fuel is devised by, in addition to the partial oxygen pressure of the exhaust gas being brought to near total chemical equilibrium condition, the partial oxygen pressure of the exhaust gas that has not been exposed to means for adjusting the chemical equilibrium is measured, and where lambda is determined from the two partial oxygen pressures, the difference of the lambda values is obtained, and this difference is used as a measure for the concentration of the sum of residual hydrocarbons in the exhaust gas.

9 Claims, 8 Drawing Sheets

METHOD AND APPARATUS FOR MEASURING AND CONTROLLING THE AIR-FUEL MIXTURE, E.G. IN MOTOR VEHICLES

FIELD OF THE INVENTION

The present invention relates generally to a method and device to test and control the air-fuel ratio, for instance, in motor vehicles. It can be used in motor vehicles with and without catalytic converter systems, and in addition, for instance, for measurements on flames, flue gases and industrial fumes generated at the more or less complete conversion of fuel using an oxidant.

BACKGROUND

When catalytic converter systems of motor vehicles with internal combustion engines, which are the main focus of this discussion of the prior art, are to be optimized and controlled with regard to the removal of hazardous materials, the first objective is to keep the chronological mean value of the air-fuel ratio lambda, which should clearly fluctuate between values of >1 and <1 in order to ensure proper operation of the catalytic converter system, at a value close to 1, preferably at 1.00±0.02, by controlling the fuel or air supply to the engine, and the second objective is to monitor the reliable operation of the catalytic converter under such controlled conditions.

How one can determine lambda from the signal of an oxygen sensor in any exhaust gas, brought to total chemical equilibrium by knowing the mean chemical composition of the fuel, and thus, to immediately set lambda to an optimal value during engine service or to control it on board, has recently been described (German patent application DE 43 23 879.3). However, measurement and optimization of lambda must be supplemented by monitoring proper operation of the catalytic converter. Monitoring the proper operation can be performed, for instance, with conventional CO, $CO_2$, NO and HC test instruments based on the infrared absorption method. However, the measurements are rather complex in nature and, therefore, costly and not very suitable for implementation on board motor vehicles.

Observing the aging patterns of catalytic converters of exhaust cleaning systems has revealed that, according to expectations based on physics and chemistry, the effectiveness will first diminish with regard to the conversion of hydrocarbons. "Aged" catalytic converters will continue to largely remove CO and NO, while slow-reacting hydrocarbon molecules will already flow through the catalytic converter to a larger degree without adjustment of the chemical equilibrium.

These realizations lead to the requirement to monitor the functionality of the catalytic converter preferably through the presence of hydrocarbons in the exhaust gas. However, the problem is that not just one well-known hydrocarbon compound will remain in the exhaust gas, but rather mixtures of numerous different hydrocarbons, depending on fuel, temperature in the engine and exhaust pipes (that is, dependent on the engine load), and the activity of the catalytic converter. (The chemical formula $CH_x$ shall be used here to indicate such mixtures.) It is not optimal to measure the concentration of a single compound, but rather to obtain a signal representing the sum of hydrocarbons in the exhaust gas. An additional problem is that the chemical quality of the exhaust gas changes abruptly at lambda=1: $CH_x$ must be detected at lambda<1 in a mixture made up mainly of nitrogen and water gas ($CO+CO_2+H_2+H_2O$), and at lambda>1 in a mixture made up primarily of nitrogen, water vapor, carbon dioxide and oxygen. The $CH_x$ signal should be independent of the hot exhaust gas, be it reducing (rich gas mixture, lambda<1), neutral (lambda=1) or oxidizing (lean gas mixture, lambda>1). Only with diesel engines can Lambda be expected to be always >1.

Lambda measurements are paramount for car service stations to adjust the engine control and to monitor the exhaust gas for hydrocarbons in order to evaluate the operation of the catalytic converter. Mobile units obtaining gas samples from the exhaust pipes would fulfill the requirement. However, the measurements must be performed at different loads, which would require an expensive engine test stand, or that the measurements be performed during a test drive. For the latter, the instrument must be battery-operated and shock-resistant for on-board use. There is a tendency today, to measure a number of vehicle data continuously through on-board diagnosis and to display these data to the driver. Because of the environmental situation, it is desirable to continuously display lambda and a parameter representing the operation of the catalytic converter, to allow the driver to recognize operating conditions that violate permitted emission values. This would enable the driver to adjust his driving to an environmentally sound style, to follow the aging process of the catalytic converter, and to recognize when the converter needs to be regenerated or replaced.

With stable on-board sensors available to continuously measure lambda and $CH_x$, the signals of these sensors could also be employed for automatic control or control correction of the engine.

The technical task to achieve the goals outlined above is to supplement the measurement method for lambda in exhaust gases brought into total chemical equilibrium as disclosed in German patent application DE 43 23 879.3 by a method and device such that a signal representing the total concentration of $CH_x$ combinations in the exhaust gas is obtained at any lambda value. It would be desirable to have a device that can be carried on board motor vehicles continuously and that can be used for automatic control, or to correct the control, of engines.

SUMMARY OF THE INVENTION

These objectives are achieved by a method where, downstream of the catalytic converter system, the partial oxygen pressure is measured, once directly in the not-additionally-treated exhaust flow, and once in the exhaust flow brought into total chemical equilibrium by known suitable means and where lambda is calculated for the two partial oxygen pressures and where the difference between the two lambda values serves as a measure for the $CH_x$, concentration in the exhaust gas. Additionally, the differences may be converted into concentrations of a representative material or material mixture, of a known hydrocarbon gas or gas mixture, or of HC according to conventional measurement methods, using factors that have been determined mathematically for representative materials or material mixtures, or experimentally with certain known hydrocarbon gases or gas mixtures or by comparison with HC results obtained with conventional instruments.

Several methods to measure the partial oxygen pressure are known, such as using electrolytic cells, for instance, with oxide ion conducting solid electrodes on $ZrO_2$ basis, or with resistive sensors on the basis of electrical conductivity, for instance, of pure or doped $TiO_2$ or mixed oxides with perovskite structure. In practical installations, oxygen may be present in the gas prior to adjustment of the total chemical equilibrium leading to relatively high partial oxygen pressure measurements, corresponding to lambda>1, and that after adjustment to total chemical equilibrium conditions in the gas only extremely small partial oxygen pressures can be measured due to the combustion of residual hydrocarbons, corresponding to lambda<1. Even small $CF_x$ concentrations in the exhaust gas to be evaluated will result in big differences between the cell voltages of two electrolytic cells (several 100 mV) and also between the electrical resistances of resistive sensors (power of ten) that, similar to the differences in the calculated partial oxygen pressures, are not representative of the existing differences in $CH_x$ concentrations existing at the two test locations.

However, as has been established, the $CH_x$ concentration in the exhaust gas is sufficiently reflected by the change of lambda through the conversion of hydrocarbon with $CO_2$ and $H_2O$ for lambda <1 and with $O_2$ for lambda>1. While the nominal voltages of potentiometric sensors and the electrical resistances of resistive sensors and the partial oxygen pressures around lambda=1 change abruptly for variations in $CH_x$ concentrations, the lambda differences vary essentially in proportion to the $CH_x$ concentrations in the exhaust gas exposed to the mentioned method. The range of the $CH_x$ concentration where the mentioned abrupt fluctuations occur depends to a large degree on lambda and on the type of hydrocarbon mixture (mean mole mass and mean value of x). On the other hand, the lambda difference without abrupt changes depends very little on lambda and indicates the total concentration of non-combusted fuel residues. The factors to mathematically convert the lambda differences into concentrations of selected hydrocarbons are determined by the mole mass and the carbon/hydrogen ratio x of the respective hydrocarbon composition.

The ideal relationship between the lambda difference and the concentration of known hydrocarbon gas mixtures, based on absolutely no hydrocarbon conversion at one sensor and total conversion to chemical equilibrium at the other sensor, can be determined mathematically. Under ideal conditions with method carried out appropriately, the results will come very close to the ideal relationship. Otherwise, the corresponding actual relationship, which can deviate from the ideal relationship due to partial conversion of the hydrocarbon pollutants prior to and at the measuring element of one sensor and the incomplete conversion prior to and at the measuring element of the other sensor, must be determined through measurements directly with gas mixtures at equilibrium conditions that have the respective hydrocarbon mixtures added to them.

To control motor vehicles with internal combustion engines and catalytic converters based on the described method, it is advantageous that the air-fuel ratio is brought to the required fluctuation between lambda>1 and <1 based on test results and by omitting the currently customary lambda probe, and that the air-fuel ratio after the catalytic converter is corrected to a value near 1 by continuous precise measurements of the lambda mean value, and that an additional display indicates for the existing conditions whether the $CH_x$ concentrations are within the permitted range, or violate this range.

If the catalytic converter is ineffective due to low temperatures or because of age, or if vehicles without catalytic converters are examined, the following main components can be found in the exhaust gas in addition to $N_2$, $CO_2$ and $H_2O$:$O_2$, CO, $H_2$ and hydrocarbons $CH_x$. Then, relatively great partial oxygen pressures will be found in the not additionally treated exhaust gas (and correspondingly great lambda values), and after the means to adjust the chemical equilibrium greatly changed partial oxygen pressures and correspondingly great lambda differences. In such cases, the method sums various effects caused by the incomplete fuel conversion with air. Here, the lambda differences indicate more than simply the $CH_x$ concentrations; CO and $H_2$ influence the parameter as well. However, for each CO or $H_2$ molecule, only 0.5 $O_2$ molecules are required, on the other hand, for each hex molecule, 9.5 $O_2$ molecules are required for oxidation; thus, a hex molecule has 19 times the effect on the lambda difference than a CO or an $H_2$ molecule. In either case, the lambda differences increase as the sum of the pollutant concentrations increases.

Principally, the method is also suitable to display the emission of pollutants in motor vehicles with diesel engines when the means to adjust the chemical equilibrium is designed for secondary combustion of high-molecular hydrocarbons up to the size of soot particles (agglomerates of carbon and high-molecular hydrocarbons), for instance, by applying high temperatures, and when a sufficiently accurate oxygen measurement is achieved. At idle, with 15 to 17 percent by volume $O_2$ in the exhaust gas of the diesel engine, the effects of the secondary combustion on the oxygen concentration are practically negligible. At full load and approx. 4 percent by volume $O_2$ in the exhaust gas, the cell voltage of approx. 40 mV must be measured at an accuracy of approx. 0.2 mV to measure the concentration of pollutants dependably.

The device to carry out the method includes two oxygen sensors, with the measuring element of one being located in the exhaust gas emitted by the motor vehicle and the measuring element of the other sensor being located in the exhaust gas brought to near total chemical equilibrium, as well as means to process the sensor signals, to mathematically determine lambda from the signals of the two sensors, to build the difference between the two lambda values, and to display the lambda of the gas with equilibrium condition and the lambda difference or concentrations calculated from these values using certain factors. Primarily, electrolytic cells with oxide-ion-conducting solid electrodes (potentiometric oxygen sensors) and electrical resistors that correlate to the partial oxygen pressure (resistive oxygen sensors) are used as sensors.

Using the device, the total chemical equilibrium can be strived for with different means. Even the flow of the gas sample through a pipe heated to more than 1000° C. can to a large degree lead to the desired total gas equilibrium if the speed of the gas is sufficiently low. In most cases, however, lower temperatures and the use of catalytic converters will be preferred. The installation in gas with frequent fluctuations between lambda<1 and >1 requires redox-stable catalytic converters, that is, designs with precious metals. In one variation of the embodiment, the untreated exhaust gas passes over the measuring element of one sensor, while in parallel an exhaust gas passes through a catalytic converter system to the measuring element of the other sensor. In another variation, the exhaust gas passes first over the measuring element of one sensor in an untreated condition, then through the catalytic converter system, and finally over the measuring element of the other sensor.

It is advantageous if the pipes with the parallel gas streams or the pipe with the sensors in succession, together with temperature sensors and electrical cables for the sensors along the pipes, are sheathed with a porous and electrically non-conducting material and if porous coatings of heat conductor (conductive resistance-heating) materials with stepped heating power are applied directly to the sheathing. The heating power stages are designed such that the heating current heats the sensors to a desired and in the area of the sensor uniform temperature, and the catalytic converter to the maximum temperature optimal for the particular installation with a gradual reduction in temperature to the one of the sensors in the stream of the exhaust gas after secondary combustion. The porous and electrically non-conducting ceramic layer may be made, for instance, of sprayed-on corundum, the porous heat conductor layer of silicon carbide, molybdenum silicide or lanthanum-strontium-chromite. Of course, the heating stages of the measuring device can also be accomplished with a split heat conductor and different controlled voltages to the individual heat conductor sections. However, it is easier to accomplish electrical contacts to supply the heater current to one heat conductor with different heating power stages than to individual sections of the heat conductor. The easiest way to accomplish different heating power stages is by geometric design (cross section and length), but different porosities or changes in the material composition of the heat conductor may be employed as well. It is important that the sheathing of the unit with heat conductors (instead of coiled wires or meander-shaped conductors) achieves a reduction, in thermally caused measurement errors, which is necessary to obtain correct measurement results.

The measuring element of one sensor may also be located close to the measuring element of the other sensor in the same exhaust gas stream, if the measuring element of one sensor is designed such that there is virtually no catalytic effect, while the measuring element of the other sensor is covered by a coating with catalytic effects on the combustion reaction and is itself made of catalytically active materials. With this design of the device, the use of potentiometric and of resistive oxygen sensors is possible as well.

In either case, the two sensors must deliver the partial pressure or the oxygen concentration as accurately as possible to be able to compute lambda. Resistive sensors with sufficient stability and a large measurement range may be installed completely in the gas to be measured, whereas in contrast potentiometric sensors require a reference electrode, which one generally implements with air at the gas-tight wall of a solid electrolyte on the side opposite the gas to be measured.

Using a catalytic converter system separate from the measuring elements has the advantage that a near total chemical equilibrium can actually be achieved through design and temperature. However, if the measuring elements are located close to one another, one without and the other with distinct catalytic characteristics, the two sensors will be at approximately the same temperature. With such a design, variable and unpredictable non-equilibrium conditions can be expected at the two measuring elements, such that $CH_x$, can be only indicated but not precisely measured.

There are certain optimal ranges for the temperatures of each sensor. The temperature of the sensor in the untreated exhaust gas should be in a range where the perturbations of the oxygen reactions caused by secondary reactions and adsorption processes have essentially disappeared, and where the reactions of the residual hydrocarbons are still slow; according to experience, this range is between 600° C. and 800° C. The temperature of the sensor in the exhaust gas treated with the hot catalytic converter should be about the same as the temperature of the catalytic converter, so that the chemical equilibrium achieved in the catalytic converter does not need to change significantly in the sensor. Thus, the catalytic converter for the secondary combustion with a temperature of approx. 900° C. to 1100° C. should extend into the region of the sensor with a temperature of approx. 900° C. (see DE 43 23 879.3).

For precise measurements, lambda should be exact to one thousandth, which requires partial oxygen pressures that are determined as accurately as possible, in addition to exact calculation formulas. This requirement can be achieved only when the individual sensors are essentially isothermal, which thus far has generally not been the case with commercial lambda sensors for motor vehicles.

However, using this method, devices may also be manufactured that, without striving for a complete conversion of the residual hydrocarbons in the exhaust gas, provide only semi-quantitative statements whether a concentration threshold for residual hydrocarbons has been violated or not. Depending on whether the one or the other aim is pursued, devices of different complexities can be used.

BRIEF FIGURE DESCRIPTION

Further details and advantageous refinements of the methods and devices subject to the invention are set forth in the following description and associated drawings, of which

DETAILED DESCRIPTION

Measurements in the exhaust gas of motor vehicles yield very different results, depending on the condition of the system and its load; the method is, therefore, better described using data calculated for certain conditions that are kept at constant levels. Such data are concretely available for potentiometric sensors. In addition, the advantages of this method can be shown most clearly in a comparison with data that could ideally be expected with conventional $CH_x$, sensors.

Figure 1:
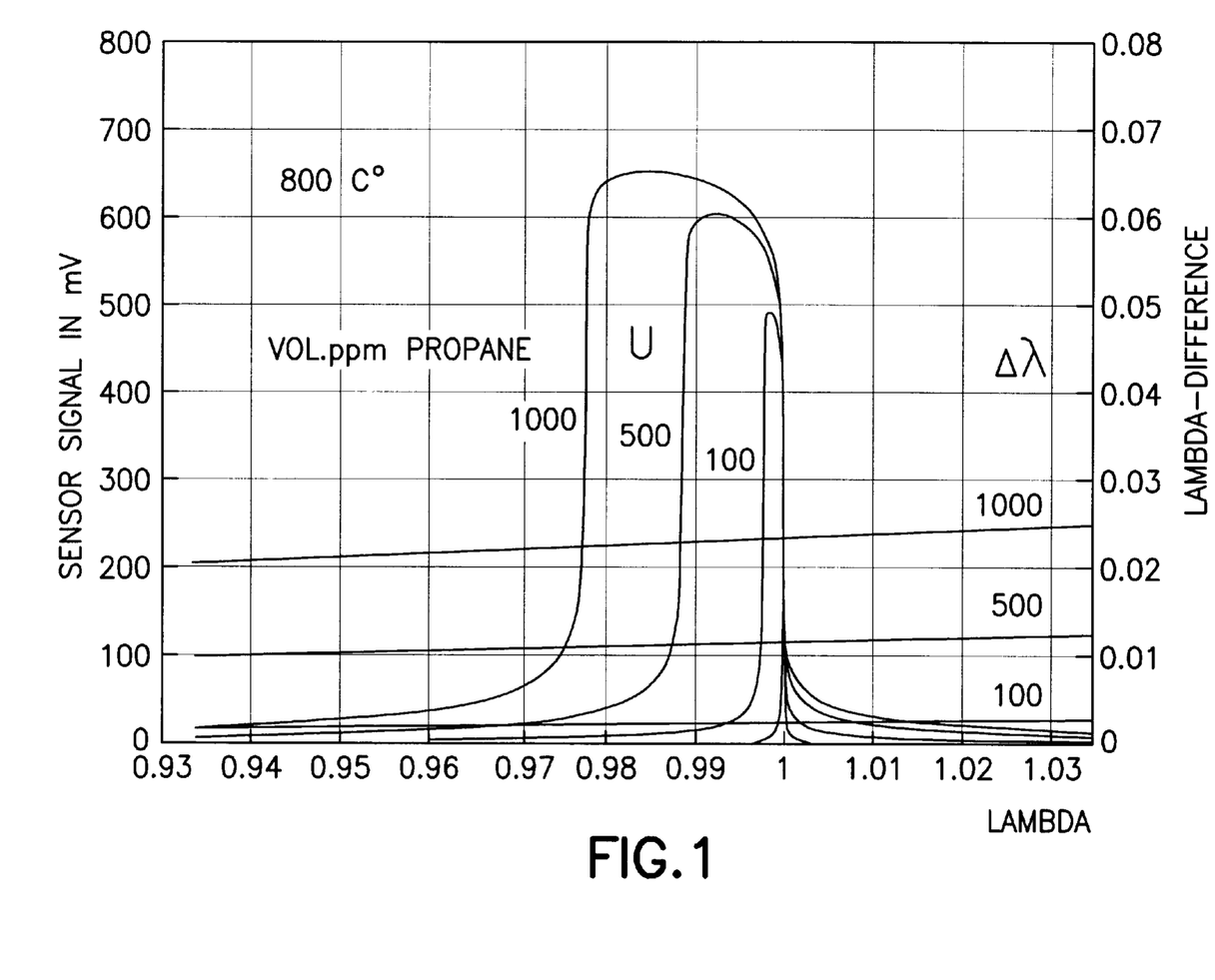
FIG. 1 is a diagram showing the maximum voltages of potentiometric sensors for propane (1000, 500, 100, 10 vol. ppm) at 800° C. and the lambda differences at the combustion of a fuel with a carbon/hydrogen ($H_2$) ratio of 1, depending on lambda and corresponding to the conditions.

FIG. 1 shows the electrical voltage of an electrolytic cell with an oxide ion conducting solid electrolyte at 800° C. between an electrode without catalytic activity and one electrode where catalytic converters establish a total chemical equilibrium, at four different propane concentrations in a gas otherwise brought into chemical equilibrium, over lambda of a combustion exhaust gas resulting from air and the composition $C_nH_{2n}$. High peaks are found in these ideal curves of potentiometric propane sensors, with the peaks declining quickly in height and width as the propane concentration decreases and disappearing totally at lambda=1. Similar curves (FIG. 2) are found for four residual octane concentrations, remaining at the combustion of octane in air; the height and width of the curve is greater only because 12.5 $O_2$ molecules are converted for one octane molecule as opposed to 4.5$O_2$ molecules for one propane molecule. These curves illustrate that the signals of potentiometric sensors for hydrocarbons depend to a large degree on lambda, in addition to the type and concentration of the hydrocarbon. Aside from the fact that these ideal curves are not fully obtainable at isothermal sensors, the use for quantitative $CH_x$, measurement seems difficult to imagine.

Figure 2:
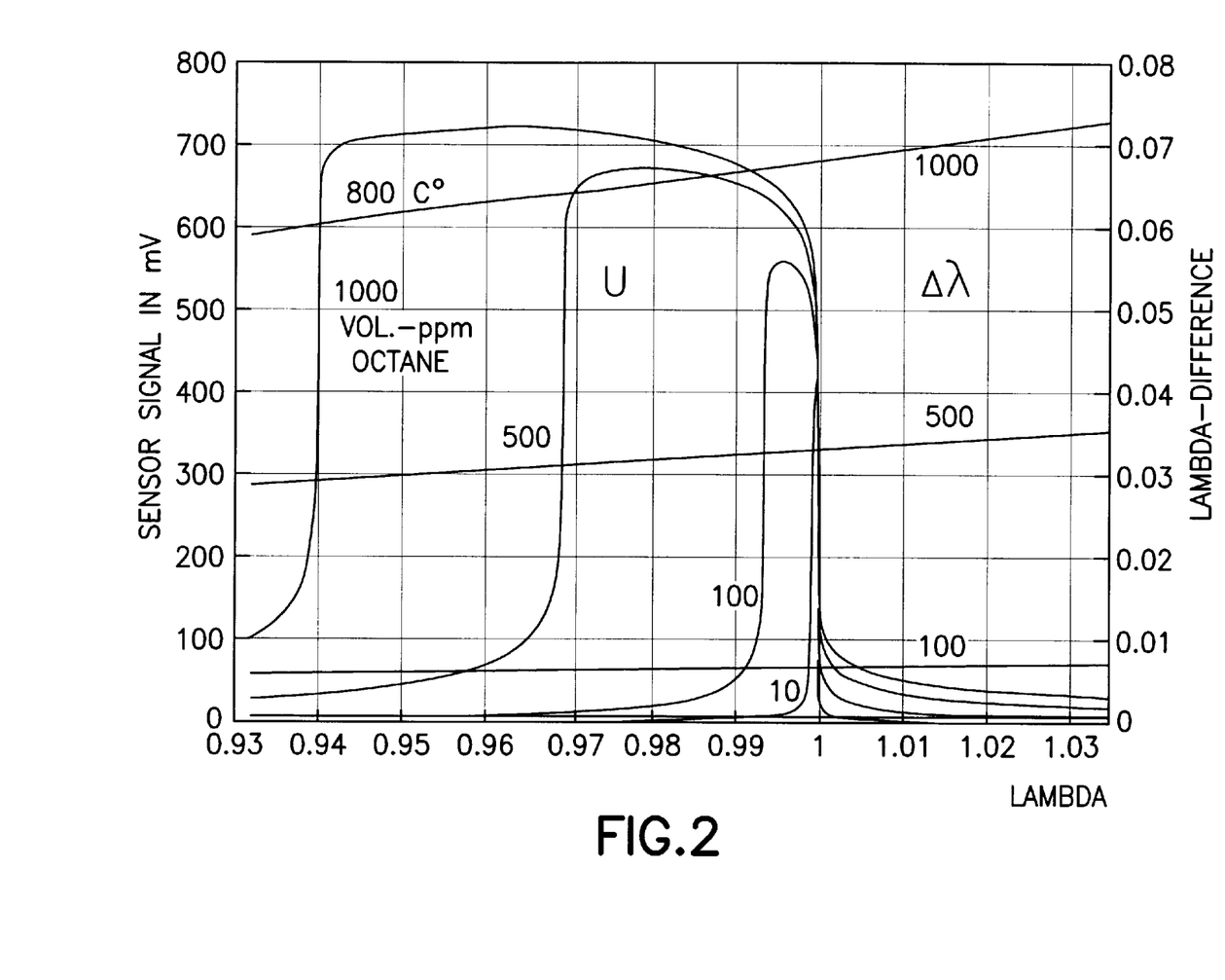
FIG. 2 is a diagram showing the maximum voltages of potentiometric sensors for octane (1000, 500, 100, 10 vol. ppm) at 800° C. and the lambda differences at the combustion of octane depending on lambda and corresponding to the conditions.

When there are reference electrodes opposite the same electrodes such that partial oxygen pressures can be determined, and calculations of lambda and lambda differences become possible, one obtains under otherwise equal conditions the curves shown in FIGS. 1 and 2 for the lambda differences without any abrupt changes and with only a minor dependency of the lambda differences on lambda.

Figure 3:
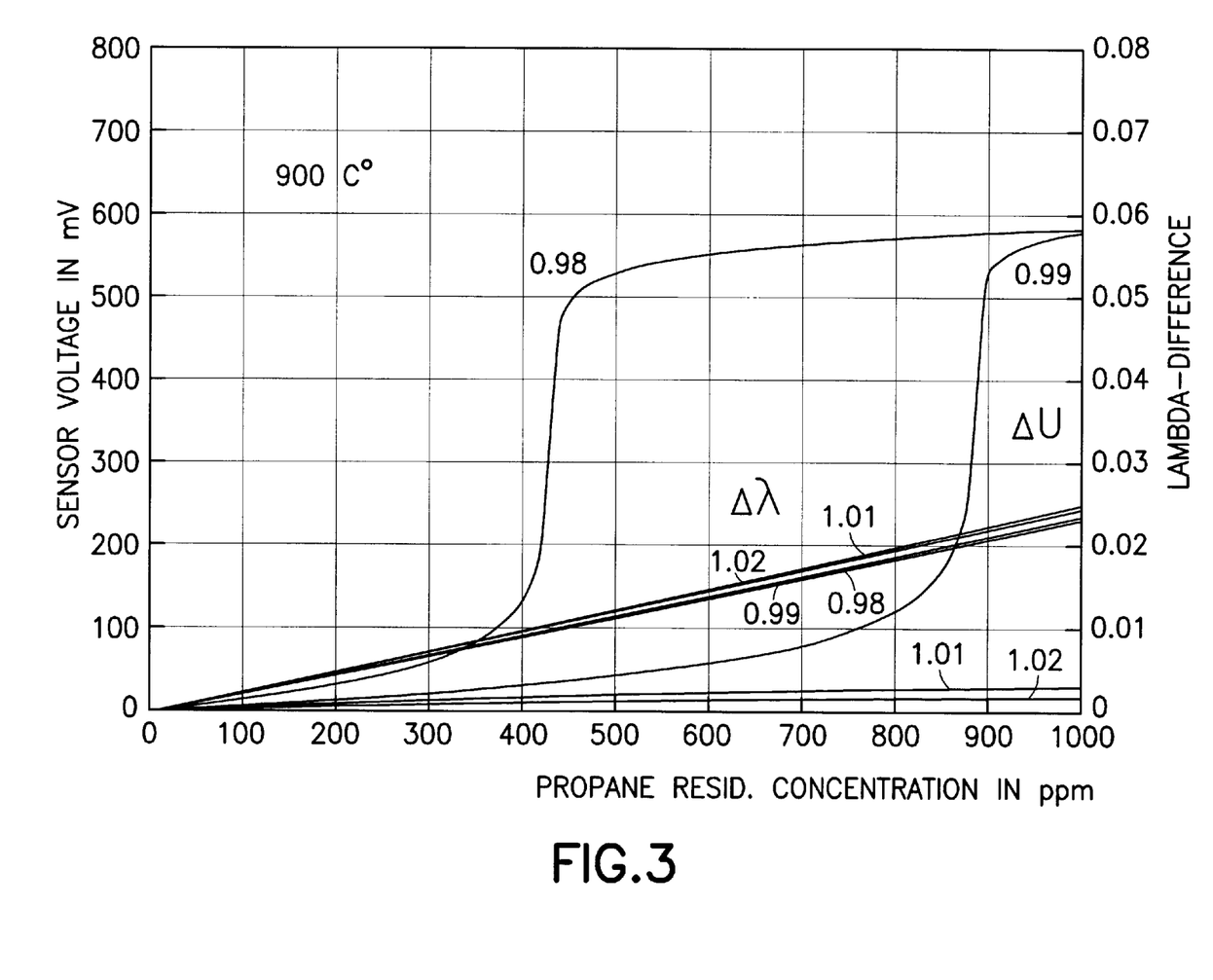
FIG. 3 is a diagram showing the dependency of the lambda difference and the cell voltage difference of isothermal electrolytic cells at 900° C. on the propane concentration in the gas at equilibrium formed from a fuel with a carbon/hydrogen ($H_2$) ratio of 1 with air at four different lambda values.
Figure 4:
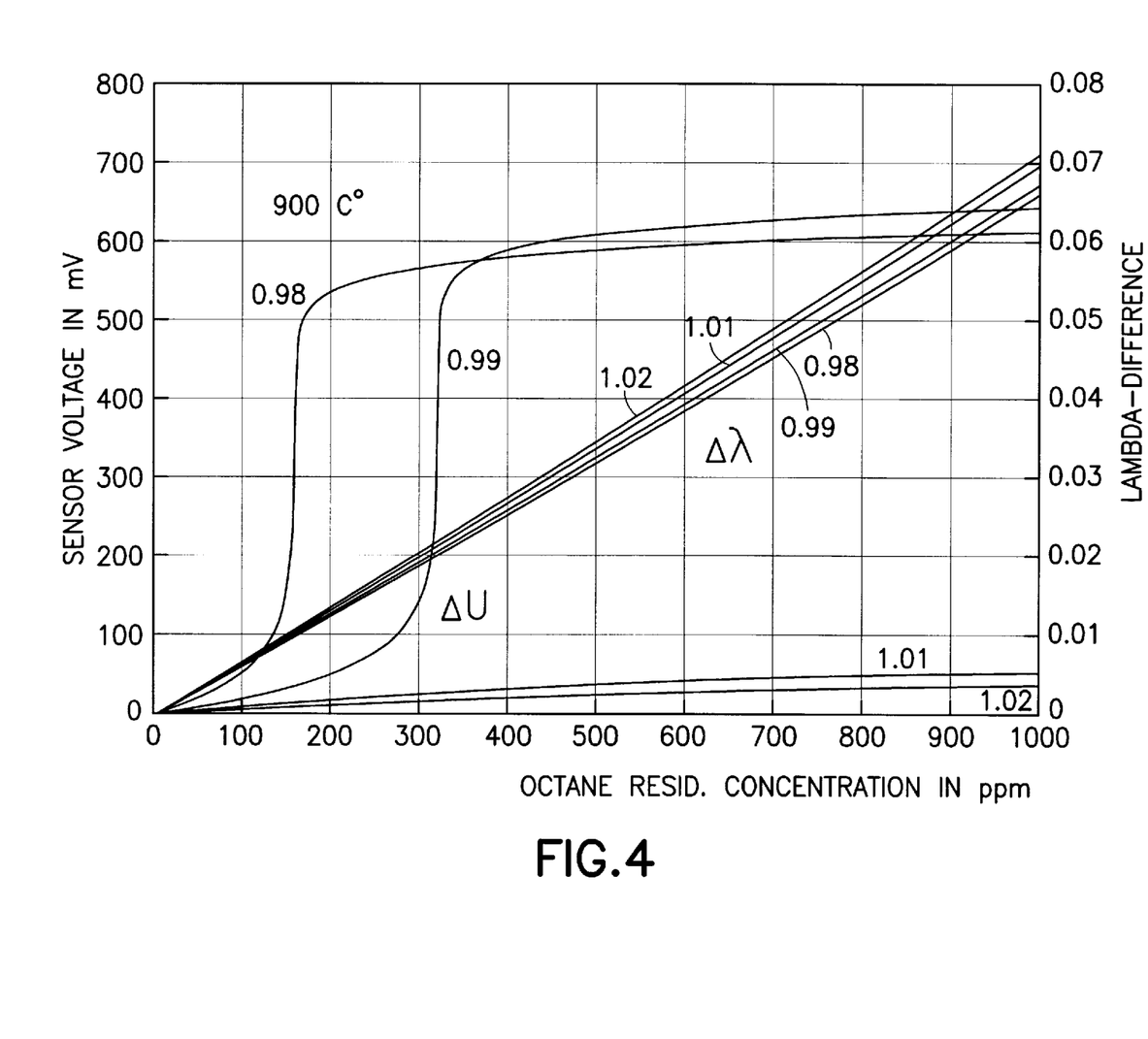
FIG. 4 is a diagram showing the dependency of the lambda difference and the cell voltage difference of isothermal electrolytic cells at 900° C. on the octane concentration in gas at equilibrium formed from octane with air at four different lambda values.

FIGS. 3 and 4 show the electrical voltages and the lambda differences for various lambda values for the same sensors in relation to the residual propane or octane concentrations in the respective exhaust gas. For lambda values <1, abrupt changes occur in the voltage curves, but not for lambda values >1. The lambda differences, however, increase uniformly with the hydrocarbon concentration. This rise differs significantly depending on the type of hydrocarbon but very little depending on lambda. In practical installations, a decision will need to be made whether to use the lambda difference itself as a measure for the residual hydrocarbons or whether the lambda difference should be mathematically converted into the concentration of one material that is to represent the sum total of residual hydrocarbons, using a factor that has been determined for a certain material and sensibly for lambda=1 either by calculation or by experiment.

Of the many possible devices that would be able to apply this method, depending on the requirements for accuracy and reproducibility of the result, only a few examples shall be mentioned here.

Figure 5:
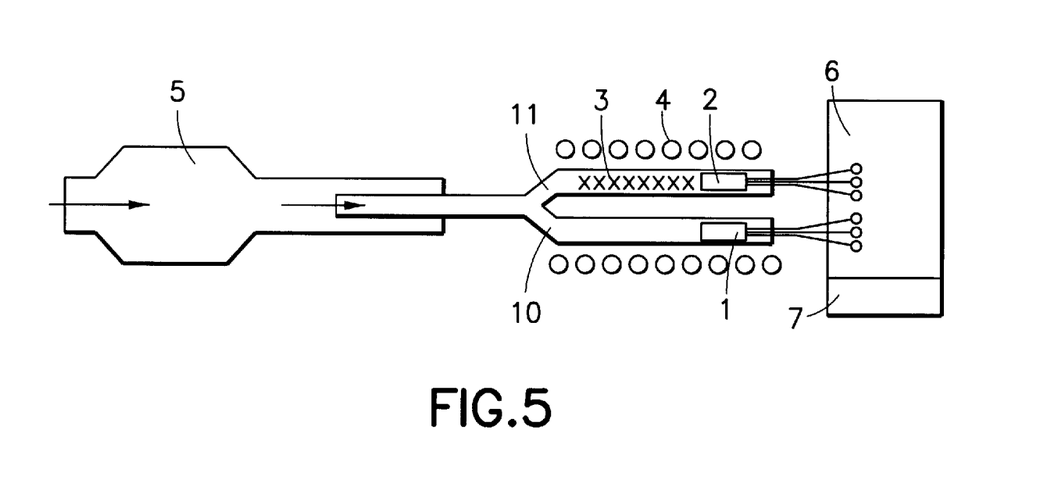
FIG. 5 is a schematic drawing of a measuring device with two resistive oxygen sensors in two parallel gas streams, with one stream passing through a catalytic converter system prior to the sensor.

As illustrated in FIG. 5, a portion of the exhaust gas flows from the catalytic converter 5 of the motor vehicle into the measuring device, which is kept at an operating temperature using the heating device 4, and is split into two parallel streams in the measuring device. One exhaust gas stream passing through pipe 10 is supplied directly to the resistive sensor 1, the other, flowing through pipe 11, passes through a catalytic converter system 3 before it flows around the resistive sensor 2. The signals coming from the sensors are processed in a known manner to calculate and display lambda using an electronic device 6, and by certain means 7, the difference between the two lambda values is generated and displayed directly, or this difference is multiplied by a factor and thus converted to obtain a value for the concentration of a hydrocarbon gas representative for the sum total of residual hydrocarbons.

Figure 6:
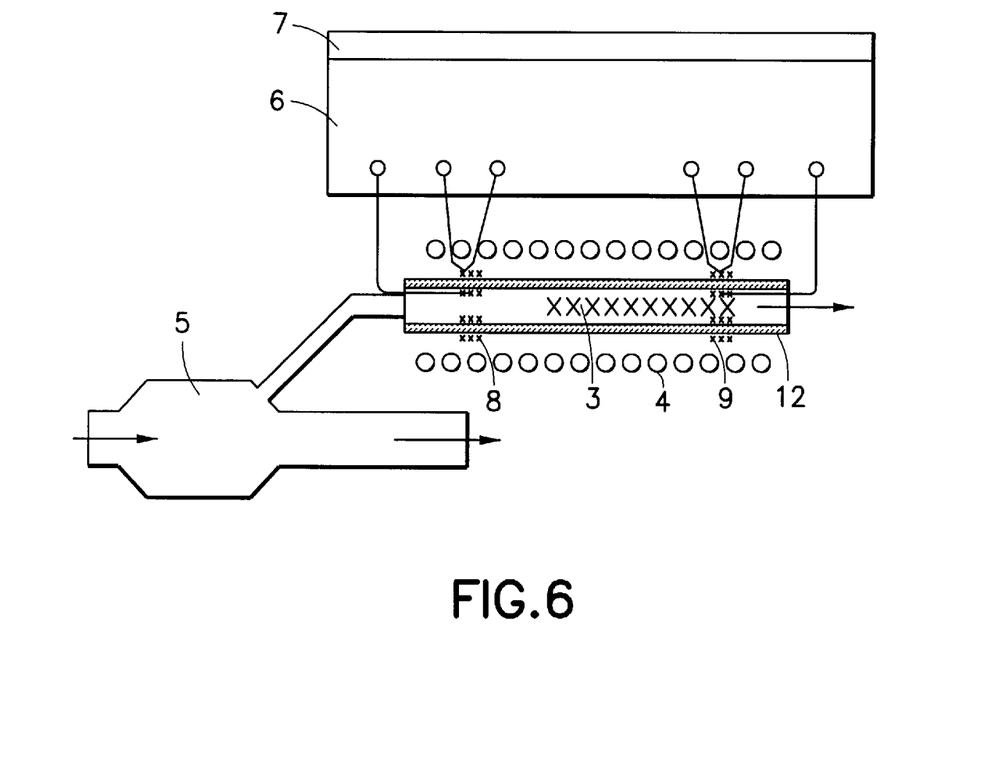
FIG. 6 is a schematic drawing of a measuring device with two potentiometric oxygen sensors in a gas stream with a catalytic converter system between the two sensors.

As illustrated in FIG. 6, the exhaust gas to be analyzed is guided directly from the end piece of the catalytic converter 5 into a pipe 12 that contains in succession the potentiometric sensor 8, the catalytic converter system 3 and the potentiometric sensor 9. Each potentiometric sensor is comprised of a measurement electrode inside pipe 12, made of solid electrolyte material, and an air reference electrode on the outside of pipe 12.

The electrical heating device 4 keeps sensors 8 and 9 and the catalytic converter system 3 at the required operating temperatures. Signal processing at 6 is designed for potentiometric sensors and is otherwise in 6 and 7 the same as mentioned with regard to FIG. 5.

Figure 7:
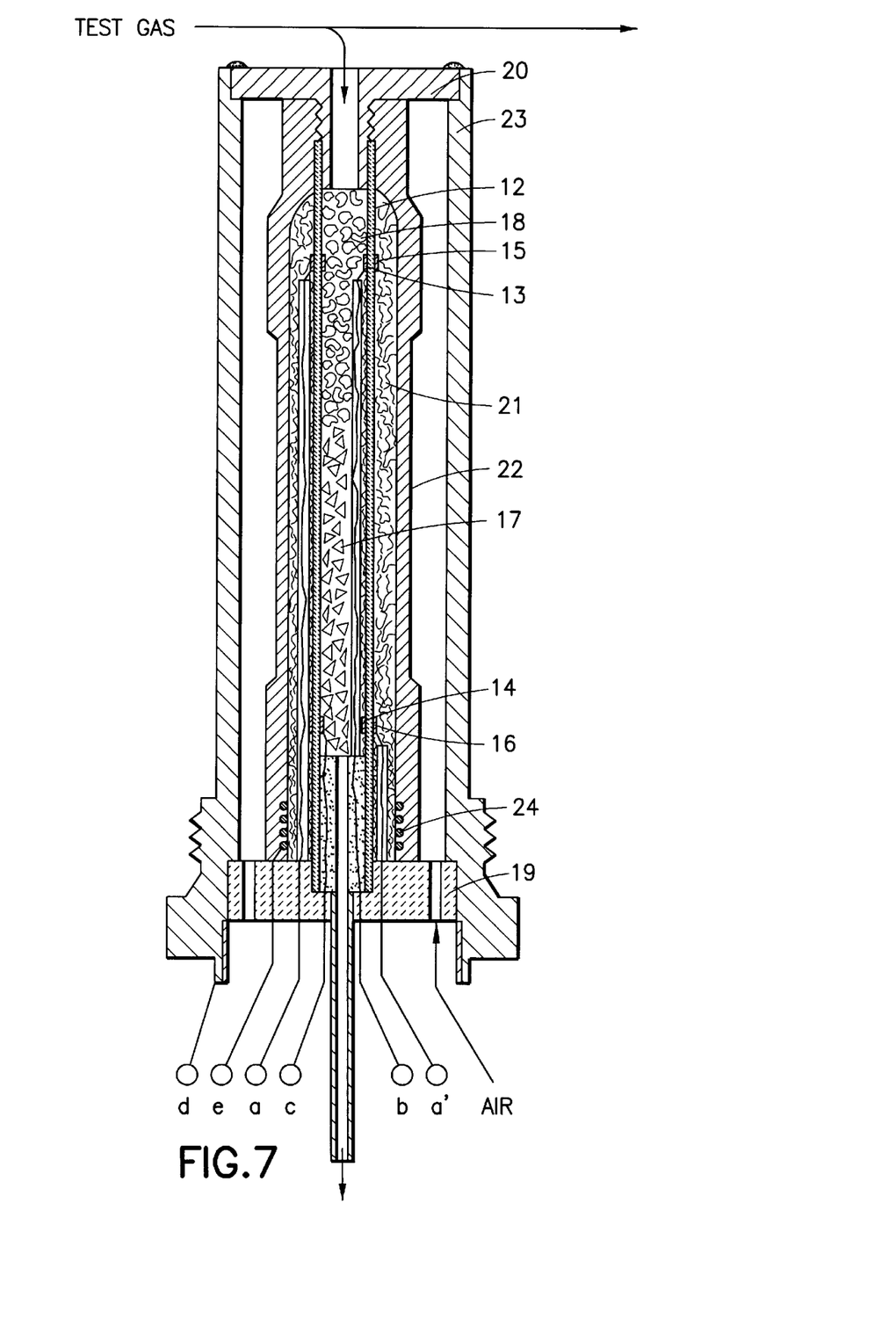
FIG. 7 is a design with two successive solid electrolyte pipe cells and one catalytic converter system between the two cells that are sheathed by one electrically non-conducting and one heat conducting coating.

FIG. 7 illustrates a special design of the sensor arrangement described in FIG. 6; its core piece can be used in exhaust test instruments, or can be installed in the end piece of the sheathing of a catalytic converter (see 5 in FIG. 6) together with the equipment shown in FIG. 7. The solid electrolyte pipe 12 consists of a thin-walled $ZrO_2$ ceramic that is resistant to temperature fluctuations with the short measurement electrodes 13 and 14 each constructed of one sintered on wire loop being located on its inside and the two air reference electrodes 15 and 16 being located on the outside. Porous granular catalytic converter material 17 is situated in between and reaches into the area of the measurement electrode 14, the remaining space is filled with granular material 18 made of sintered corundum. The leads to the electrodes are pointing to one side and are wired to a ceramic base 19 in an electrically non-conducting manner and the solid electrolyte pipe 12 with its openings for the passage of air and its axial outlet for the gas to be measured is attached to this base as well . The other side of the solid electrolyte pipe 12 is attached to a steel piece 20 with an opening for the inlet of the gas to be measured. The solid electrolyte pipe 12 mounted in such a way is sheathed on its outside, together with the reference electrodes 15 and 16, the temperature sensors (not shown) at the solid electrolyte cells, and the cables leading to these measuring elements, with a porous, electrically non-conducting layer 21. Applied to this layer 21 is a porous layer 22 of heat conductor material such that the cross section of this layer changes in order for the catalytic converter to be at a higher temperature than the electrolytic cells. The heat conductor layer 22 surrounds a thread lug at the steel piece 20, that is welded together with the protective sheathing 23 allowing for the supply of the heating current. On the other side, the electrical contacts 24 for the heating current are embedded in the heat conducting material. The electrically non-conducting layer 21, made of corundum, and the heating conductor layer 22, made of lanthanum-strontium-chromite can be applied, for instance, to the rotating solid electrolyte pipe 12, containing the measuring elements and supply cables, using plasma powder spray methods.

The heating current is supplied via contacts d and e. The cell voltage between the catalytically inactive measurement electrode 13 and the reference electrode 15 can be measured at contacts a and b and the cell voltage between the measurement electrode 14 in the gas with equilibrium condition and the reference electrode 16 at contacts a and c. The contacts for the temperature sensors are not shown.

Figure 8:
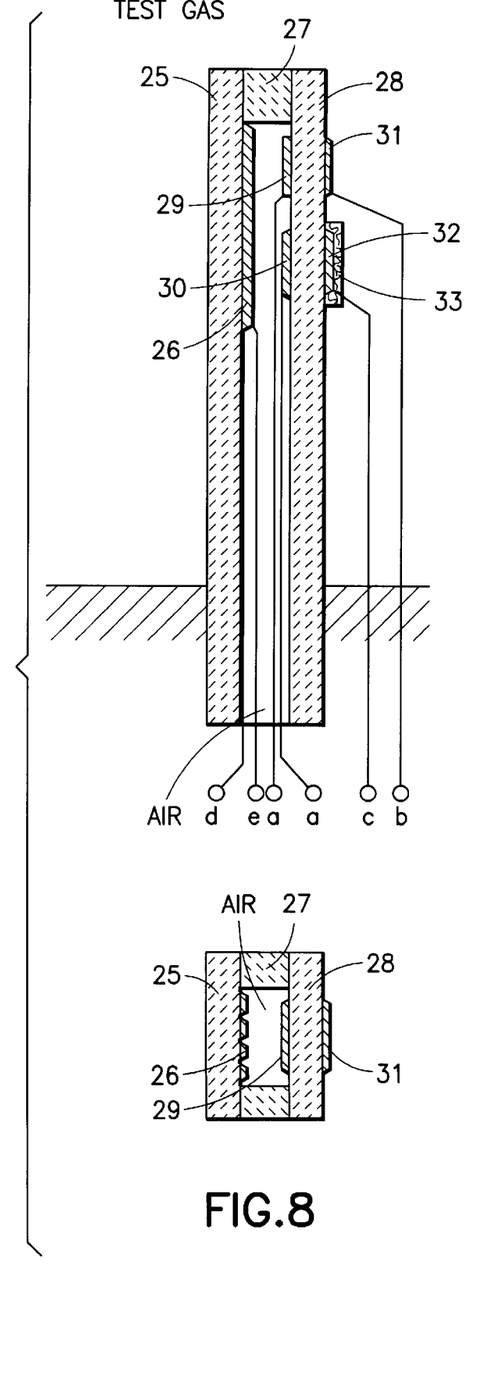
FIG. 8 and 8a are designs with plane sensors on $ZrO_2$ foil ceramic with air gap.

One efficient manufacturing method for solid electrolytic cells is the basis for the structure illustrated in FIG. 8. A ceramic foil 25 carries a heat conductor layer 26 and is joined into a gas-tight formation via a ceramic foil 27, creating an air gap, with a foil 28 made of stabilized zirconium dioxide and carrying the air reference electrodes 29 and 30 on a ceramic-adjacent face of the zirconium dioxide foil member. The catalytically inactive electrode 31 and the catalytically active electrode 32 are applied to the outside ceramic-remote force of member 28, opposite the air reference electrodes 29 and 30, together with a porous top coating 33 containing catalytic converter particles. For accurate measurements, temperature sensors (not shown) are required for both electrolytic cells. Advantageous is a heating system that allows the electrolytic cell with the catalytically active electrode to be heated to a temperature that is 100 to 200° K. higher than the one of the other cell.

Figure 8A:
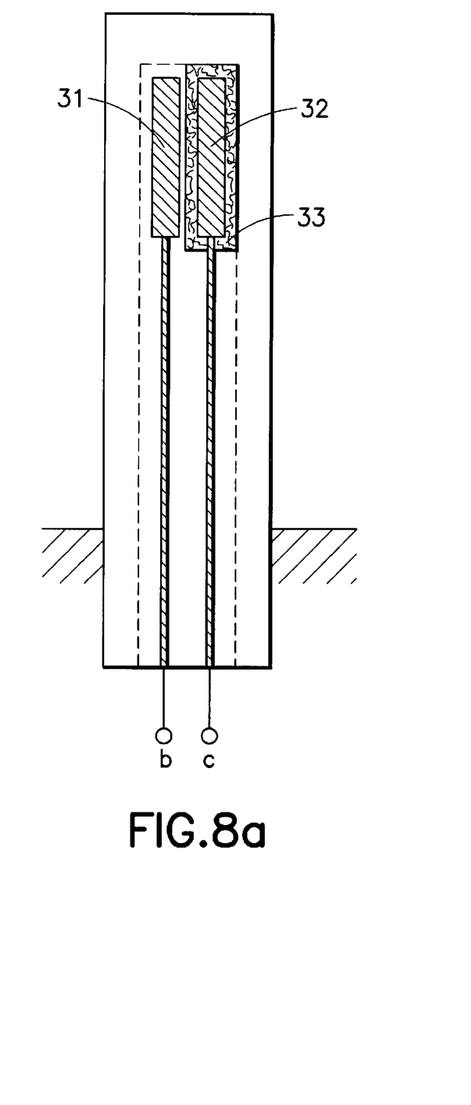

If the device is to indicate only whether the concentration of the pollutant is significantly below or above a certain threshold, the air reference electrodes 29 and 30 can be kept at the same mean temperature, and electrodes 31 and 32 can be positioned next to one another as illustrated in FIG. 8a.

Figure 9:
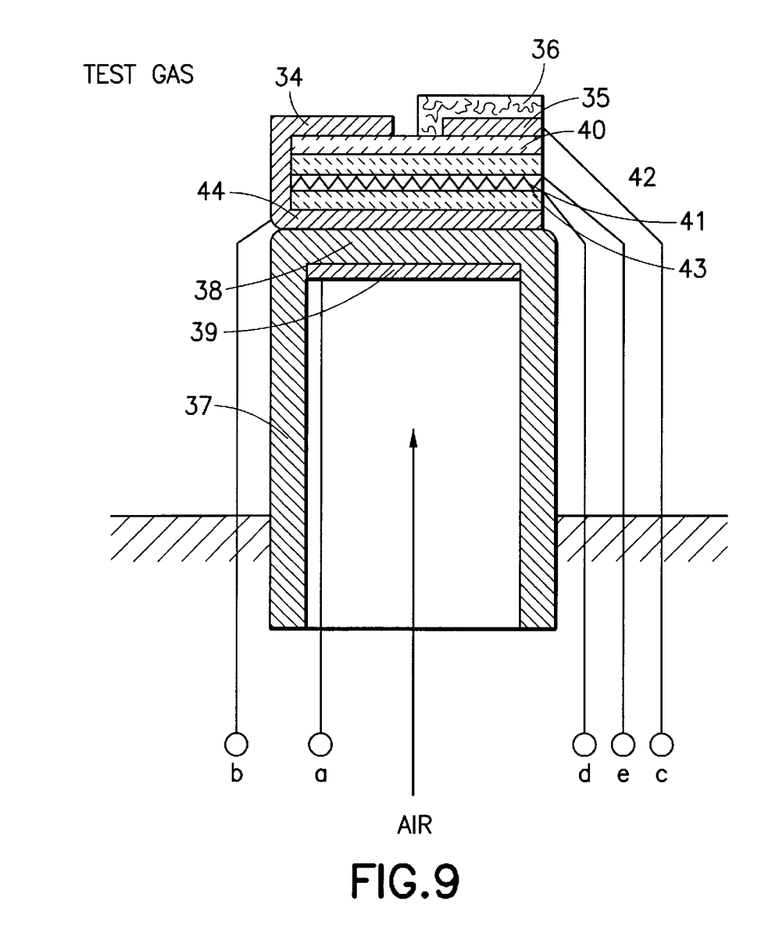
FIG. 9 is a design with thick layer sensors at the bottom of a solid electrolyte pipe with air reference electrode.

FIG. 9 illustrates how a sensor prepared efficiently using screen printing and having a catalytically inactive electrode layer 34 and a catalytically active electrode layer 35, which is covered with a porous layer containing catalytic converter particles 36, is set up to determine lambda and lambda differences by combining it with a gas-tight pipe 37 made of partially stabilized zirconium dioxide with a flat bottom 38 and an air reference electrode 39. The electrode layers 34 and 35 are located on a porous ceramic 40 made of partially stabilized zirconium dioxide. To improve the adjustment of the chemical equilibrium at the electrode layer 35, the portion of the ceramic 40 located underneath the electrode layer contains catalytic converter particles in its pores as well. A heat conductor layer 41 between the two electrically non-conducting ceramic coatings 42 and 43 keeps the electrolytic cells at operating temperature. The bottom 38 of pipe 37 carries a catalytically inactive metallic coating 44 that may be of the same type as the electrode coating 34 and that is connected with this coating 34 in an electrically conducting manner. Lambda of the untreated exhaust gas is determined from the electrical voltage between a and b, and lambda of the exhaust gas near chemical equilibrium conditions is determined from the voltage between a and c, which makes available the lambda difference which is a measure for the pollutants. The heating current is supplied via contacts d and e, where the resistance representing the temperature can be measured as well.

Figure 10:
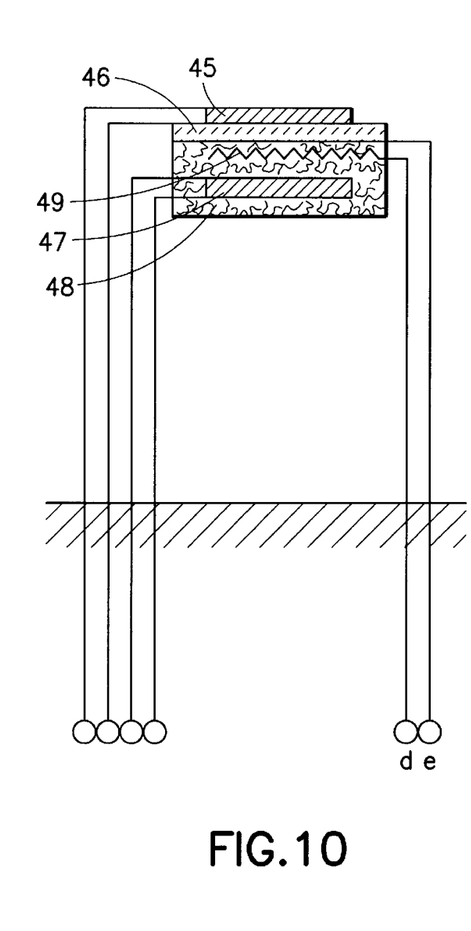
FIG. 10 is a design with two resistive oxygen sensors where one sensor is sheathed with a mass that is catalytic to the combustion reactions.

FIG. 10 illustrates a resistive sensor 45 on a dense ceramic carrier 46, which is directly exposed to the gas to be measured, and a second resistive sensor 47, which is embedded in an electrically non-conducting mass 48 containing particles catalytic to combustion reactions. A heater 49 provides the operating temperature of the device.

It is difficult to implement isothermal sensors and to achieve complete chemical equilibrium conditions in the exhaust gas using the devices illustrated in FIGS. 8 through 10. Thus, the results achieved with them are not very reliable. Calibrations need to be performed repeatedly and a rough indication of the pollutants needs to be satisfactory.

What is claimed is:

1. A method, adapted for use on board a motor vehicle, of reliably measuring total unburned hydrocarbons in exhaust gas from a combustion engine of said vehicle, for purposes of adjusting an air/fuel mixture ratio $\lambda$ supplied to said engine, by deriving from partial pressures of oxygen in said exhaust gas, an operating parameter ($\Delta\lambda$) which, under conditions of both rich mixture ($\lambda<1$) and lean mixture ($\lambda>1$), increases uniformly with increasing total unburned hydrocarbon concentration, even for mixture ratio values approximating one, comprising the steps of:

measuring (1, 8) a first oxygen partial pressure in exhaust gas (10) leaving said engine;

electrically heating (4) at least some of said exhaust gas (11) sufficiently to bring said exhaust gas to near total chemical equilibrium;

measuring (2, 9) a second oxygen partial pressure in said electrically heated exhaust gas; and deriving, from a comparison of measurements of said first and second oxygen partial pressures, said uniformly increasing operating parameter ($\Delta\lambda$).

2. The method of claim 1, wherein said first and second oxygen partial pressures represent lambda values, said operating parameter is a difference of said lambda values, and further comprising the step of mathematically converting said lambda value difference into a value representing concentration of a particular type of hydrocarbon.

3. The method of claim 1, further comprising the steps of measuring said lambda value difference at a plurality of different temperatures of said electrically heated exhaust gas, and deriving a function which correlates respective difference values to concentrations of respective hydrocarbon molecules of different sizes.

4. An apparatus for reliably measuring total unburned hydrocarbons in exhaust gas from a motor vehicle engine, comprising a first oxygen partial pressure sensor (1, 8) located in a first flow path (10) of exhaust gas from said engine;

an electric heater (4, 22, 26) heating at least some of said exhaust gas (11) to a temperature sufficient to bring said exhaust gas to near total chemical equilibrium;

a second oxygen partial pressure sensor (2, 9) subjected to said electrically heated exhaust gas; and a signal processor (6, 7) coupled to respective signal outputs of said first and second oxygen partial pressure sensors, comparing said respective signal outputs of said partial pressure sensors, and deriving an operating parameter ($\Delta\lambda$) which, under conditions of both rich mixture ($\lambda<1$) and lean mixture ($\lambda>1$), increases uniformly with increasing total unburned hydrocarbon concentration, even for mixture ratio values approximating one.

5. The apparatus of claim 4, wherein said second sensor (9) is located in said first flow path and downstream of said first sensor (8).

6. The apparatus of claim 4, wherein said second sensor (2) is located in a second flow path (11) separate from said first flow path (10).

7. An apparatus according to claim 4, characterized in that two resistive oxygen sensors (45 and 47) are exposed to the exhaust gas where the one oxygen sensor (45) is applied to a gas-tight ceramic carrier (46) and the other (47) is embedded in a porous mass (48) containing particles that catalyze combustion reactions.

8. An apparatus for reliably measuring total unburned hydrocarbons in exhaust gas from a motor vehicle engine, comprising a ceramic substrate (25);

a zirconium dioxide member (28) arranged in spaced relation to said ceramic substrate (25), defining therebetween an air space open at one end for entry of reference air, said member (28) having a ceramic-adjacent face and a ceramic-remote face;

an electric heating layer (26) applied to a surface of said ceramic substrate (25) facing said ceramic-adjacent face of said zirconium dioxide member (28);

a catalytically inactive electrode (31) located on said ceramic-remote face of said zirconium dioxide member (28), and cooperating with a first reference electrode (29) located on said ceramic-adjacent face of said member (28);

a catalytically active electrode (32) located on said ceramic-remote face of said zirconium dioxide member (28) and cooperating with a second reference electrode (30) located on said ceramic-adjacent face of said member (28); and a porous coating (33) containing catalytically active particles and covering exposed surfaces of said catalytically active electrode (32).

9. The apparatus of claim 8, wherein the heating layer is configured to heat the catalytically active electrode (32) to a higher temperature than the catalytically inactive electrode (31).

* * * * *